United States Patent

[11] 3,628,065

[72] Inventor Donald Gifford Hill
Boulder, Colo.
[21] Appl. No. 84,435
[22] Filed Oct. 27, 1970
[45] Patented Dec. 14, 1971
[73] Assignee Bell Telephone Laboratories, Incorporated
Murray Hill, N.J.

[54] CLOCK PULSE GENERATOR
9 Claims, 9 Drawing Figs.

[52] U.S. Cl. .......... 307/269, 307/208, 307/279, 328/55, 328/63, 307/293
[51] Int. Cl. .......... H03k 5/00, H03k 5/156
[50] Field of Search .......... 307/205, 208, 269, 279, 293; 328/63, 55; 307/293

[56] References Cited
UNITED STATES PATENTS

| | | | |
|---|---|---|---|
| 3,441,751 | 4/1969 | Benedict | 307/269 X |
| 3,479,603 | 11/1969 | Overstreet | 307/208 X |
| 3,502,994 | 3/1970 | Ott et al. | 328/55 X |
| 3,510,787 | 5/1970 | Pound et al. | 307/269 X |

*Primary Examiner*—John S. Heyman
*Attorneys*—R. J. Guenther and Edwin B. Cave

ABSTRACT: A variable speed two-pulse clock circuit or pulse generator is formed by a group of time delay sections connected in cascade in combination with logic control circuitry. Each time delay section is formed from a combination of IG-FETS and MOS capacitors and, hence, the system lends itself to production by integrated circuit fabrication techniques.

INVENTOR
D. G. HILL
BY E. J. Olinder
ATTORNEY

CLOCK PULSE GENERATOR

BACKGROUND OF THE INVENTION

1. Field of the Invention

This invention relates to pulse generation systems and more particularly to dual pulse, clock pulse generators. 2. Description of the Prior Art Clock pulse generators perform a critical function in virtually every major type of electronic system that requires the performance of sequential, repetitive, timed operations. One example of a common use for clock pulse generators is in the control of digital computers in which the performance of precisely ordered and carefully timed steps characterizes the heart of the system. Another example is provided by pulse communication systems.

To a considerable degree, the particular requirements of the system to be served dictate the general form of the clock pulse generator to be employed. Accordingly, such generators may comprise only a simple multivibrator in one instance while in another, a substantially more complex arrangement might be required. One characteristic common to prior art clock pulse generators in general, however, is that the circuits tend to become unduly complex whenever the requirements to be met extend beyond very basic specifications. Complexity, in turn, is generally responsible for reduced reliability and increased costs.

Accordingly, a general object of the invention is to reduce the structural complexity of a clock pulse generator having relatively complex performance requirements. Another object is to adapt such a circuit to the fabrication techniques of integrated circuitry.

SUMMARY OF THE INVENTION

The stated objects and related objects are achieved in accordance with the principles of the invention by a clock pulse generator formed from a unique combination of solid-state logic control circuitry and time delay sections. The particular requirements that a generator in accordance with the invention is designed to meet include the generation of two repetitive clock pulses in which the inception and termination points of one pulse bracket the corresponding points of a substantially simultaneous but shorter pulse. An additional requirement is the availability of two speeds of operation.

In accordance with the invention, the delay sections are formed from a combination of insulated-gate-field-effect-transistors (IGFETS) and metal-oxide semiconductor (MOS) capacitors. The time delay function itself is provided by discharging the capacitors through the high impedance of the IGFETS. All of the delay sections are connected in cascade, and each of the four is identified with either the leading or trailing edge of one of the two pulses that form the simultaneous pulse pair. A pilot signal and logic gates interact with the delay sections to ensure the proper sequence of generation.

Figure 8A:
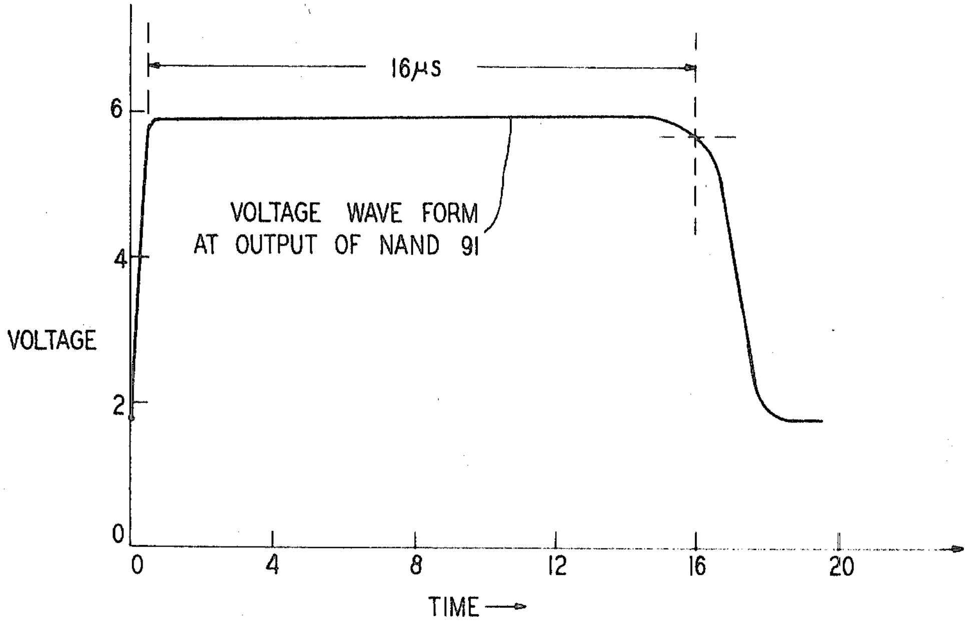
Figure 8B:
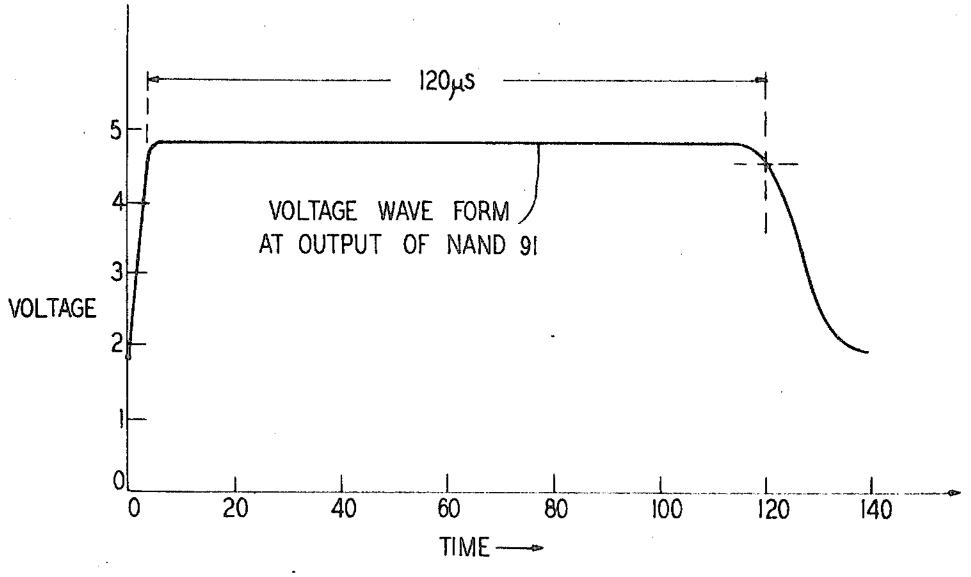

GIG. 7 is a plot of worst-case longest pulses for a generator in accordance with the invention;

FIG. 8A is a plot illustrating minimum time delay between successive pulses from a generator in accordance with the invention; and FIG. 8B is a plot illustrating maximum time delay between successive pulses from a generator in accordance with the invention.

DETAILED DESCRIPTION

As a preface to a consideration of specific circuit details, it will be helpful to examine certain design requirements and assumptions that are involved in constructing a clock pulse generator in accordance with the invention. It should first be noted, however, that a clock pulse generator as discussed herein has possible application for use in a wide variety of electronic control arrangements. For example, it may be employed to drive the 60-bit IGFET shift register of the direct station selection (DSS) telephone set disclosed in the copending Pat. application of A. A. Bukosky, M. A. Flavin, D. G. Hill, D. D. Huizinga and J. F. Ritchey, Ser. No. 881,515, filed Dec. 2, 1969. In the Bukosky et al. DSS set, bits are read out of a given register and processed in groups of four, since four bits per digit are employed. The processing rate is controlled by a two-mode clock circuit of the type disclosed herein which, when in the slow mode, generates short pulses at a 60 Hz. rate. Accordingly, the DSS set is able to complete dialing electronically in less than two seconds after depressing a desired station switch. For some instances, the DSS set requires that its memory registers be reset within 40 milliseconds. For this operation, the clock is changed to a fast mode and pulses are generated at a higher rate to return the 60 bits to their proper position in the register. It is to be noted again, however, that this use of a clock pulse generator in accordance with the invention is merely illustrative.

Figure 1:
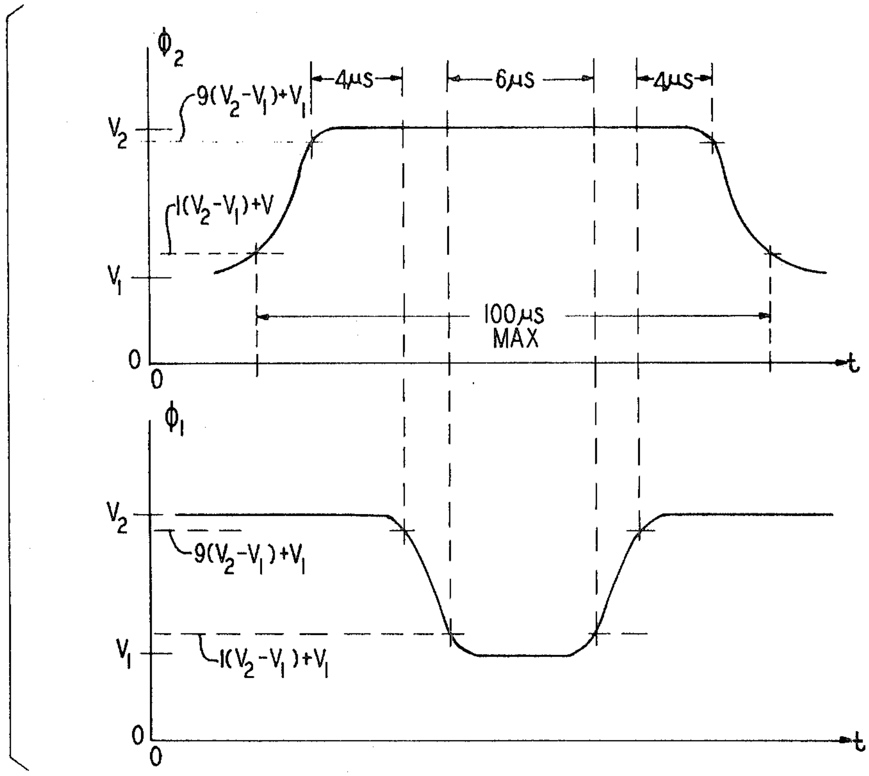
FIG. 1 is a plot of idealized pulse waveforms of the type produced by a generator in accordance with the invention.

As indicated in FIG. 1, the clock generates two substantially simultaneous pulses, $0_1$, a positive pulse, and $0_2$, a negative pulse. As indicated, the pulse $0_2$ exists for at least 4 microseconds before and for at least 4 microseconds after the generation of the 6 microsecond $0_1$. A requirement is that under worst-case operation the duration of the pulse $0_2$ cannot exceed 100 microseconds. Additionally, the clock is required to have two modes of operation, and in the slow mode the pulses $0_1$ and $0_2$ must be at a 60 Hz. rate and a 60 Hz. pilot signal is presumed to be available for triggering. In the second or fast mode, the time between successive $0_2$ pulses must be within the limits of 15–125 microseconds.

A pair of DC voltage sources and a single mode changing voltage source are assumed, the DC voltage sources being $+5.5 \pm 0.5$ volts and a nominal $-3.0$ volts. It is also required that the nominal $-3.0$ volts supply never dips below $-2.2$ volts. The mode changing source is required to provide two voltage levels with a $+2.0$ volt level defined as the logical 0 and $+5.0$ volt level as the logical 1.

Figure 2:
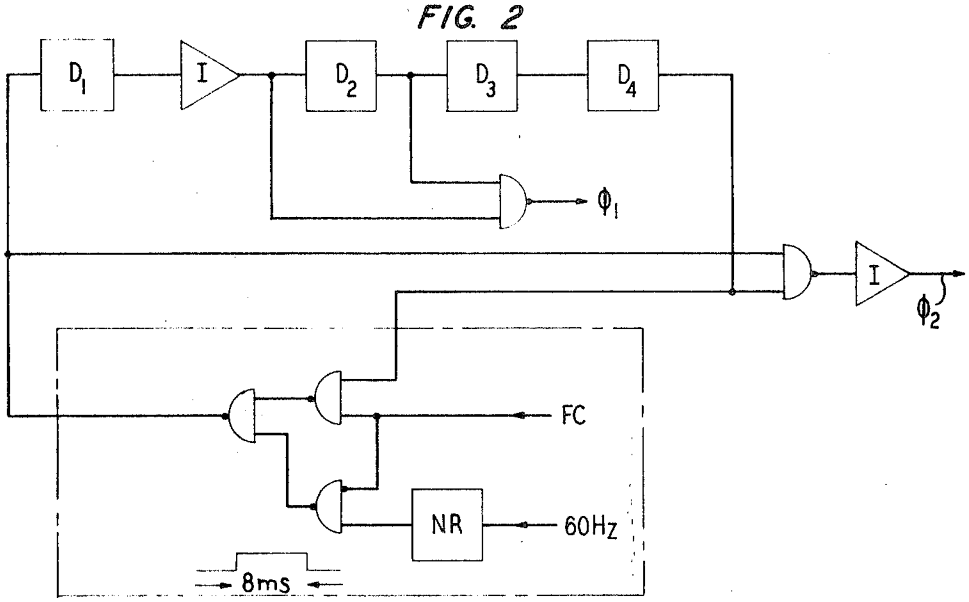
FIG. 2 is a block diagram of a pulse generator in accordance with the invention.

The requirements indicated are met in accordance with the invention by a circuit of the form shown fig. 2. Delay sections D1, D2, D3 and D4 are connected in cascade. Section D2 provides the 6 microsecond delay, and sections D1 and D4 provide the 4 microsecond delays at both ends of the pulse $0_2$. Section D3 provides the 15 microsecond delay between successive $0_2$ pulses when the clock is operating in the fast mode. Pulses are generated when the output from the logic control circuit LC changes from a logical 0 to a logical 1. This action initiates the leading edge of the pulse $0_2$, and after 4 microseconds, changes the state at the input to the delay section D2 from a 0 to a 1. NAND-gate 90 is then activated and produces the leading edge of pulse $0_1$. Six microseconds later, pulse $0_1$ ends as the output of the delay section D2 changes from a 1 to a 0. Subsequently, when the state of the delay section D4 finally changes to a 0, NAND-gate 91 is activated which terminates the pulse $0_2$.

The input point FC is provided for the mode control signal and the 60 Hz. source provides the pilot signal. When FC=0, the clock is in the slow mode and the output of NAND-gate 95 changes from 0 to 1 every 17 microseconds. When FC=1, the clock is in the fast mode and the delay section D3 determines the pulse repetition rate.

Figure 3:
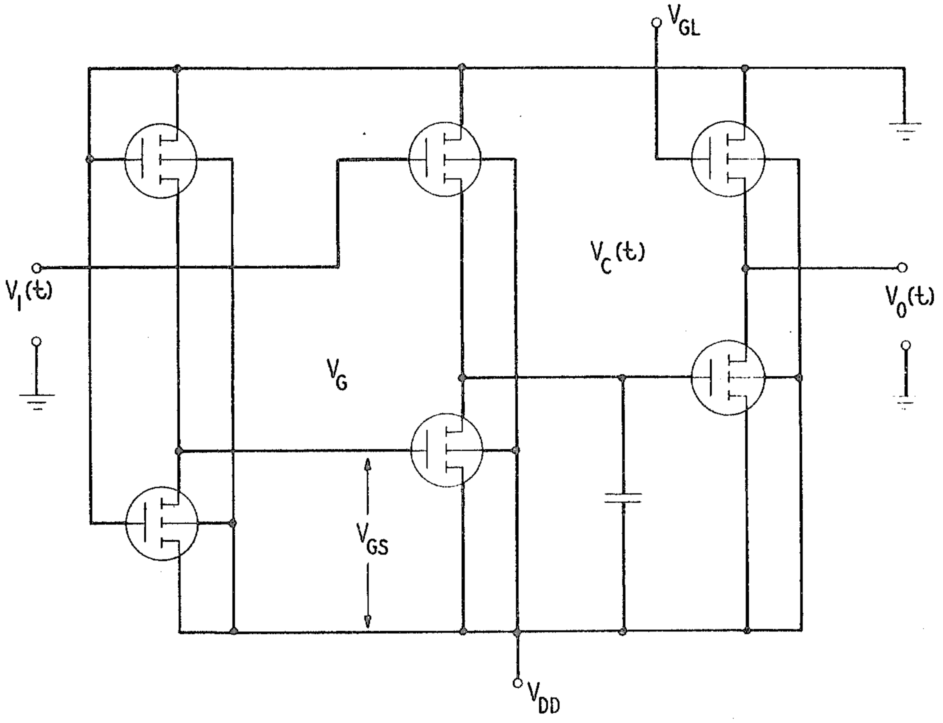
FIG. 3 is a schematic circuit diagram of one of the delay circuits shown in block form in FIG. 1.

A typical delay section which forms the fundamental building block of a clock in accordance with the invention is shown in FIG. 3. The circuit includes six IGFETS Q1 through Q6 and a single capacitor C1 and is designed for integrated circuit fabrication. In operation, transistors Q1 and Q2 act as a voltage divider to establish the voltage $V_G$ which keeps transistor Q3 turned on in the saturation region at a low-current level. When the input voltage $V_i(t)$ is at 0 volts, transistor Q4 is turned on hard and $V_C(t)$ seeks a low steady-state value, which is typically on the order of +2.0 volts. When $V_i(t)$ switches to a zero value, it is typically +5.2 volts, transistor Q4 is turned off immediately and the capacitor C1 discharges through transistor Q3 at approximately a constant current since transistor Q3 is operating in saturation. The slow discharge of capacitor C1 provides the delay action of the circuit since $V_C(t)$ rises slowly to the voltage $V_{DD}$. As $V_C(t)$ approaches a threshold voltage drop below $V_{DD}$, (nominally +4.5 volts), transistor Q5 turns off and the output voltage $V_O(t)$ goes to 0 volts. Transistor Q6 is employed as a load device in lieu of a diffused resistor which would require considerably more silicon area in an integrated circuit. When $V_i(t)$ switches to a low value, transistor Q4 is turned on hard and discharges capacitor C1 quickly. As a result, the delay through the circuit is short compared to the delay when the voltage $V_i(t)$ switches to a high value.

An important design consideration is the sensitivity of the divider voltage $V_G$ to variations in the supply voltage $V_{DD}$ and to threshold variations. The voltage $V_G$ controls the current discharge of capacitor C1 and, in turn, also controls the total time delay through the circuit.

A somewhat more detailed discussion of certain aspects of the circuit design of the delay section illustrated in FIG. 3 will provide further insights relating both to the theory and to the operation of the circuit. If the voltage $V_G$ is set so that transistor Q3 is in the saturation region, it may be shown that the current $I_D$ through transistor Q3 may be expressed as follows:

$$I_D=-(\beta/2)(V_{GS}V_{th})^2, \qquad (1)$$

where $V_{GS}$ is the gate to source voltage, $V_{th}$ is the transistor threshold voltage and $\beta$ is the conventional gain factor which is determined from physical constants. Since transistor Q3 is in saturation, the current is approximately constant when $|V_{DS}| \geq |V_{GS}-V_{th}|$. When transistor Q4 is turned off, the capacitor current $I_C(t)$ equals the current $I_D$ through transistor Q3. The voltage $V_C(t)$ across the capacitor C1 may be expressed as follows:

$$V_C(t)=\frac{1}{C}\int_0^t I_C(\tau)d\tau+V_I \qquad (2)$$

and $I_C(t)\equiv I_D$, (3)
then $$V_C(t)=\frac{\beta(V_{GS}-V_{th})^2}{2C}t+V_I \qquad (4)$$

and $$M_r\triangleq\frac{dv_C(t)}{dt}=\frac{\beta(V_{GS}-V_{th})^2}{2C}, |V_{GS}-V_{th}|\leq|V_{DS}| \qquad (5)$$

Equations (4) and (5) indicate that the voltage $V_C(t)$ is a ramp starting at the initial capacitor value $V_1$ with a constant slope $M_r$. Note also that for a given nominal slope $M_r$, less variations in $M_r$ for a given change in $V_{GS}$ are realized when the $\beta/C$ ratio is smallest. Thus, in the circuit design it is desirable to make $\beta$ as small as possible and the capacitance of capacitor C1 as large as possible, taking into consideration the area limitations and the inequality stated in equation (5). Another aspect of equation (5) is that $M_r$ is a function of $\beta/C$, which means that even though $\beta$ and C may change by as much as ±20 percent, the ratio is assumed to vary less than 15 percent because both $\beta$ and C are proportional to the same physical constants.

Figure 4:
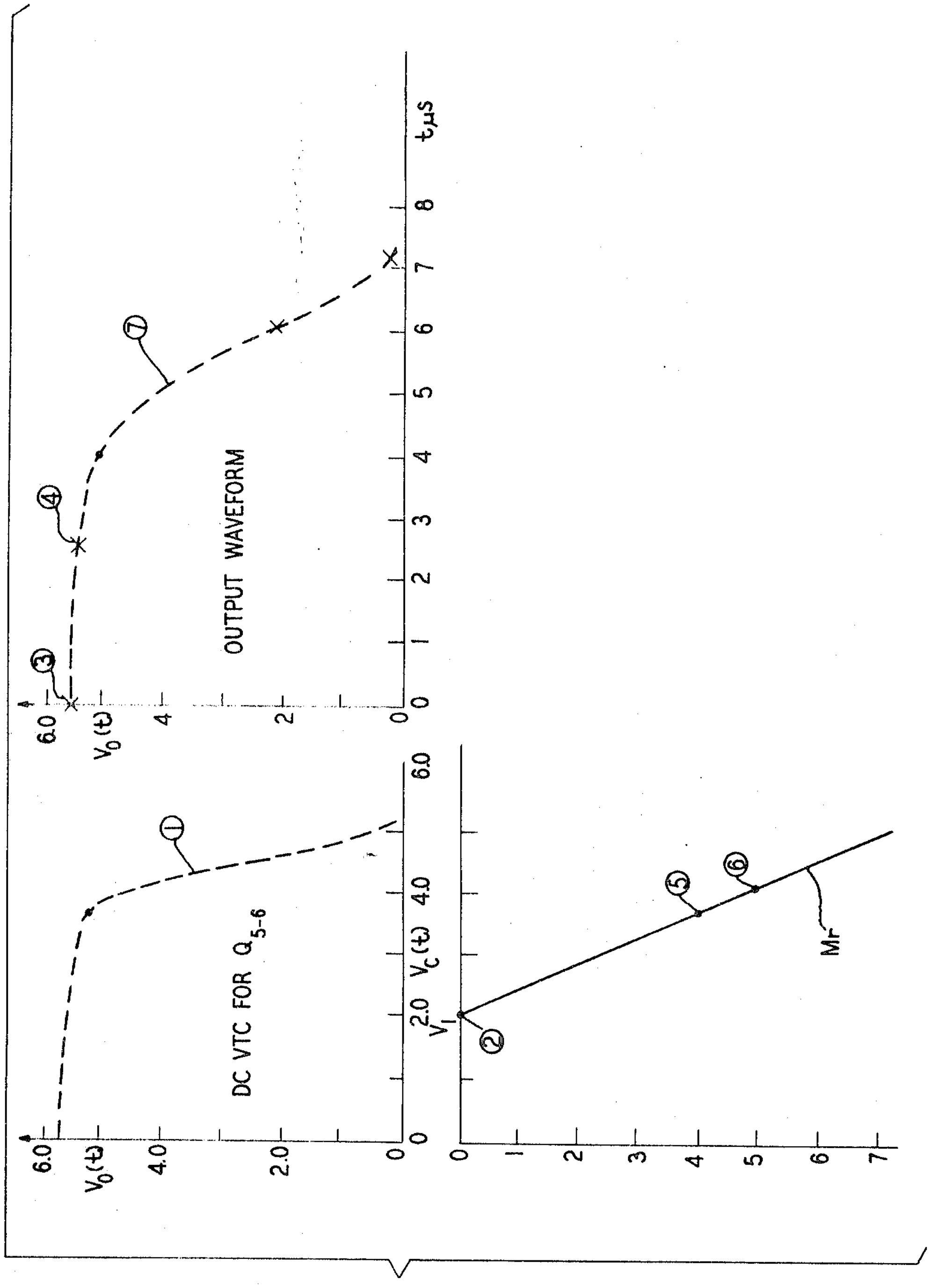
FIG. 4 is a plot illustrating a graphical means of determining the output waveform of a pulse generator as shown in FIG. 1.

If it is assumed that the voltage $V_C(t)$ is slowly varying with respect to the response time constants of transistors Q5 and Q6, then the voltage $V_O(t)$ may be obtained by using the DC voltage transfer characteristics (DCVTC) of the inverter Q5–6 consisting of the transistors Q5 and Q6. Assuming that the threshold voltages track from transistor to transistor in any one delay circuit, since they are fabricated on the same chip, it may be shown that the worst-case condition causing minimum delay between the voltage $V_i(t)$ and $V_0(t)$ is when the voltage $V_{DD}$=+6.0 volts, $V_{th}$=−0.8 volts and $\beta/C=\beta_o/C_o$+15 percent. The circuit may hence be designed by the use of equation (4) and the above-stated minimum delay worst-case conditions. As shown in FIG. 4, the DCVTC for the inverter Q5–6 is constructed with $V_{DD}$=+6.0 volts, $V_{th}$=−0.8 volts, $V_{GL}$=−3.0 volts and with the gain factor ration $G^2\triangleq\beta_5/\beta_6$=25. Note that the −3.0 volt supply is required so that $V_O(t)$ will go to zero volts when the transistor Q5 is turned off. In addition, a $G^2$ of 25 provides sufficient noise margin and promotes fast pulse transmission time. On the other hand, for the inverter Q3–4, transistor Q4 must have a much larger $\beta$ than transistor Q3 so that $V_I$ is at a low value (typically $G^2$=0.04 and $V_I$=+2.0 volts) when $V_i(t)$=0.

For the next step, the voltage $V_I$ is determined by initially assuming $V_I$=+2.0 volts and subsequently plotting $V_C(t)$ as outlined in the following steps and as illustrated in FIG. 4.

a. Find 2.0 volts, 0.0 μs on curve 3.
b. Reflect step (a) through curve 1 to find $V_O$ at t=o on curve 2.
c. Find 0.9 $V_O$, 4.0 μs on curve 2.
d. Reflect step (c) through curve 1 to find $V_C$(t) at 4 μs on curve 3.
e. Draw $V_O$(t) on curve 3 by joining points found in steps (a) and (d).
f. Reflect $V_O$(t) step (e) through curve 1 to find $V_O$(t).
g. Adjust $V_1$ from 2.0 volts if necessary. From the above plot, a value for the slope $M_r$ is established. By assuming values for $\beta_o$ and $C_o$ and assuming that $V_{th}$=−0.8, the voltage $V_{GS}$ may be calculated using equation (5). Once $V_{GS}$ is established, this voltage may be viewed as the input to the inverter Q3–4, and an appropriate DCVTC may be used to find the correct value for $V_I$. If the $G^2$ of the inverter Q3–4 is chosen to be about .04 (e.g.: $\beta_o$=$\beta_3$=1.0 μmhos/volt and $\beta_4$=25.0 μmhos/volt), then the corrected value for $V_I$ will be very close to +2.0 volts. Occasionally, this new value may be as low as +1.9 volts which may require that the ramp shown in curve 3 of FIG. 4 be replotted. This technique will change the time delay only slightly from the desired 4 microseconds. Knowing $V_{GS}$, the gain factor ratio $G^2$ for the inverter Q1–2 may be computed by using the appropriate transistor equations. Thus, the gain factors for all of the transistors may be known and the design is complete except for a check on the maximum delay time during the reverse worst-case conditions which are obtained when $V_{DD}$=+5.0 volts, $V_{th}$=−1.2 volts, and $\beta/C=\beta_o/C_o$−15 percent.

In order to determine the maximum delay for a given circuit, it is necessary to find a new $V_G$ from a DCVTC for the inverter Q1–2 when $V_{DD}$=5.0 volts and $V_{th}$=−1.2 volts. Note that the DCVTC for the inverter Q5–6 also changes for these new operating conditions. The new $V_G$ changes the values of $V_I$ and $M_r$ in equation (4). When curve 3 of FIG. 4 is replotted, using these new conditions, a lower delay will be realized on curve 2. These maximum delay times for the circuit are important because they must be accounted for in the maximum allowed time delay of 100 microseconds for the $0_2$ pulse.

It is interesting to note that the pulses $0_1$ and $0_2$ can be constructed by starting at point A of FIG. 2 and by serially progressing through each major element, keeping a graphical account of the voltage waveforms at each point. For example, consider the circuit of FIG. 2 under the operating conditions for the minimum pulse duration when $V_{DD}$=+6.0 volts, $V_{th}$=−0.8 volts and $\beta/C=\beta_o/C_o$+15 percent. To find the voltage transfer across the inverters $I_1$ and $I_2$ and across NAND-gates 90 and 91, appropriate DCVTC's may be used. A graphical method of this type will be accurate as long as the voltage transitions at the input to the inverters and NAND-gates are slow with respect to the time constants of these devices.

Figure 5:
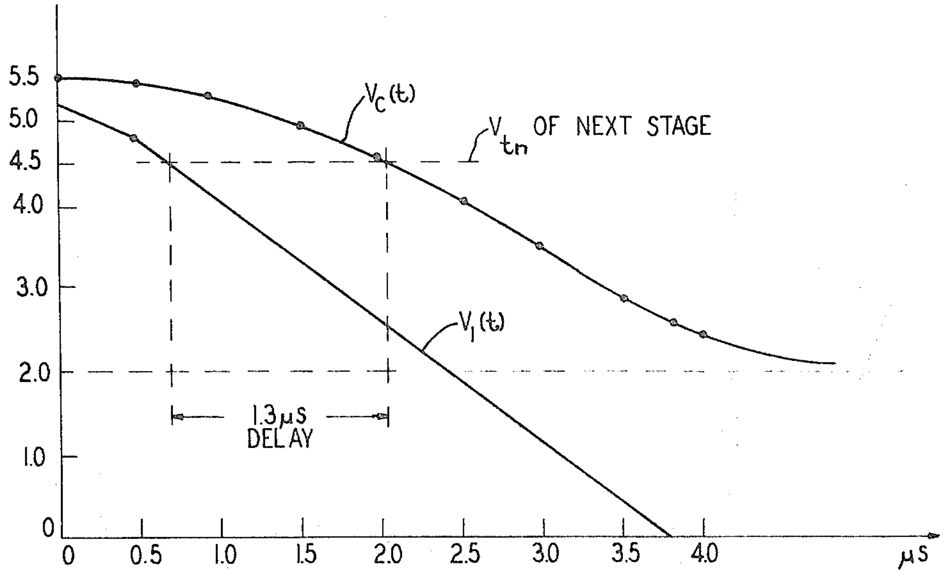
FIG. 5 is a time voltage plot illustrating reverse time delay through one of the delay sections.

The graphical technique described works adequately up to the delay circuit D3 where it is assumed that passage through the delay circuit is in the "fast" direction. Computer analysis shows that the reverse delay through a delay section of the type shown in FIG. 3 is a function of the voltage fall time at the input node. To illustrate, FIG. 5 shows a $V_C(t)$ response in the "fast" direction for the nominal case where $V_{DD}=+5.5$ volts and $V_{th}=-1.0$ volt. Note that $V_C(t)$ remains constant until $V_i(t)$ decreases at least to a threshold drop below $V_{DD}$ and that the $V_C(t)$ transition ends when the $V_i(t)$ transition ends. The important point to note is that $V_C(t)$ reaches the +4.5 volt level (the voltage at which the next stage activates) 1.3 microseconds after $V_i(t)$ reaches that level, thereby causing a reverse time delay through the delay section D3. If instead $V_i(t)$ had a very fast fall time, the reverse time delay would be quite small because the vertical separation between the two curves would be the same. By graphically accounting for this input dependent reverse delay time through the delay section D3 and by continuing through the delay section D4, the input to NAND-gate 91 and hence the pulse $0_2$ can be determined.

Figure 6:
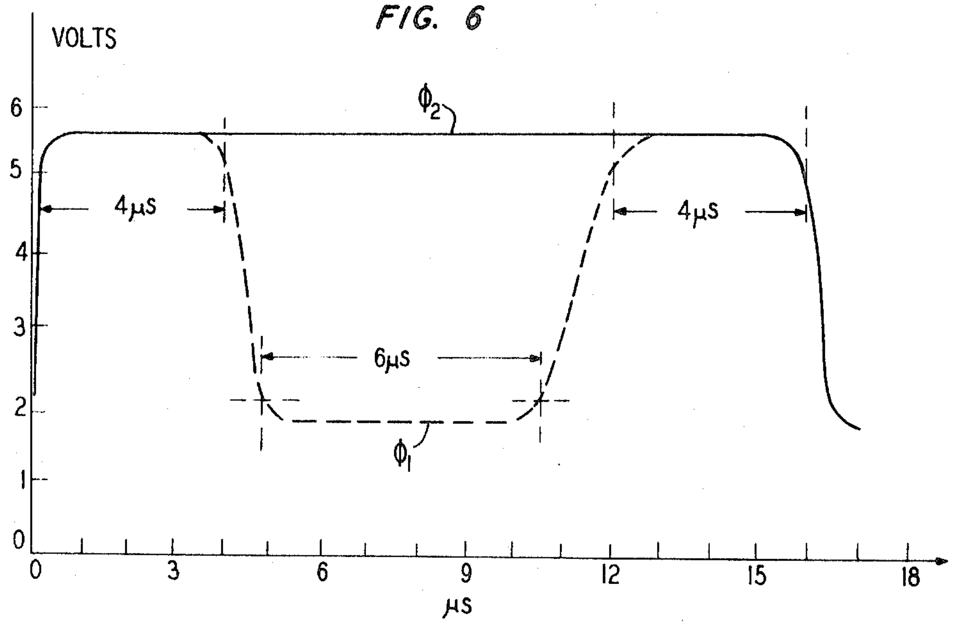
FIG. 6 is a plot of worst-case shortest pulses for a generator in accordance with the invention.
Figure 7:
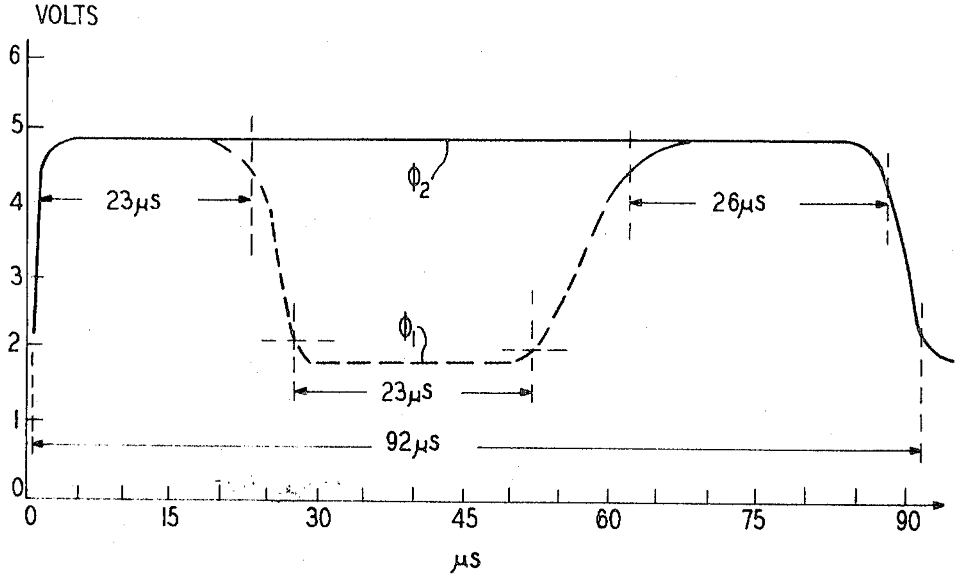

The foregoing technique was carried out using both the minimum and maximum delays through the delay section to establish worst-case bounds on the $0_1$ and $0_2$ pulses. Other delay networks with suitable parameters have been employed to produce limiting cases for both narrow and wide pulses and are illustrated in FIG. 6 and FIG. 7. For the fast clock mode, the minimum and maximum times between $0_2$ pulses are illustrated in FIGS. 8A and 8B. Computer analysis indicates that for the nominal case where $V_{DD}=+5.5$ volts, $V_{th}=-1.0$ volts and $\beta/C=\beta_o/C_o$, the pulse widths will reside approximately half way between the maximum and minimum widths.

It is to be understood that the embodiment described herein is merely illustrative of the principles of the invention. Various modifications thereto may be effected by persons skilled in the art without departing from the spirit and scope of the invention.

What is claimed is:

1. Apparatus for generating a first train of pulses of one polarity and a second train of pulses of the opposite polarity,
each of the pulses in said second train corresponding in time to a preselected portion of a respective one of the pulses in said first train comprising, in combination,
a first time delay circuit for providing a delay between the inception of a pulse in said first train and the inception of a corresponding pulse in said second train,
a second time delay circuit for establishing the duration of each pulse in said second train as an included part of the duration of each corresponding pulse in said first train,
a third time delay circuit for establishing the pulse repetition rate of pulses in said first train and hence, indirectly, in said second train,
a fourth time delay circuit for providing a delay between the termination of each pulse in said second train and the termination of each corresponding pulse in said first train,
first output logic circuitry in combination with said first and second delay circuits for producing pulses in said first train,
clock logic circuitry for supplying periodic inputs to said first logic circuit and to a second logic circuit and
said second logic circuit combining outputs from said clock circuit and from said fourth time delay circuit to produce pulses in said second train,
all of said time delays circuits being connected in cascade.

2. Apparatus in accordance with claim 1 wherein each of said time delay circuits comprises a plurality of IGFET devices and a timing capacitor, the discharge path of said capacitor being through a high-impedance path of one of said IGFET devices.

3. Apparatus in accordance with claim 1 wherein said first logic circuit includes first input means from the output of said first time delay circuit and second input means from the output of said second time delay circuit.

4. Apparatus in accordance with claim 1 wherein said second logic circuit includes first input means from the output of said fourth logic circuit and second input means from the output of said clock logic circuitry.

5. A clock pulse generator for simultaneously generating a first pulse train of one polarity and a second pulse train of an opposite polarity,
each of the pulses in said second train being of less duration than but included within the time period of a corresponding pulse in said first train,
said generator comprising, in combination, a plurality of substantially identical cascade-connected time delay circuits each including a respective timing capacitor and a relatively high-impedance IGFET discharge path therefor,
first, second and third logic circuits for establishing the operating sequence and timing control relations among said time delay circuits,
said first logic circuit having inputs derived from the outputs of two of said time delay circuits and an output establishing the time limits of the pulses of said second train,
said second logic circuit having inputs derived from the output of one of said time delay circuits and from the output of said third logic circuit and an output establishing the time limits of the pulses of said first train.

6. Apparatus in accordance with claim 5 wherein each of said time delay circuits comprises a first pair of IGFET devices forming a voltage divider,
a second pair of IGFET devices wherein one provides a discharge path for a timing capacitor and the other controls the impedance level of said path, and
a third pair of IGFET devices wherein one provides an output signal developed from the discharging of said capacitor and the other operates as a load device,
each of said pairs being connected in substantially parallel circuit configuration with each of the other of said pairs.

7. Apparatus in accordance with claim 6 including a first control voltage source connected to said load device IGFET and a second control voltage source connected to each of said second pair of IGFET devices.

8. Apparatus in accordance with claim 7 including means for applying an input signal from the output of said third logic circuit to said IGFET device of said second pair controlling the impedance level of said path.

9. Apparatus in accordance with claim 7 wherein said third logic circuit generates a square wave pilot signal output.

* * * * *